Reissued Sept. 17, 1935 Re. 19,708

UNITED STATES PATENT OFFICE 19,708

MANUFACTURE OF PHENOL FORMALDEHYDE CONDENSATION PRODUCTS

Alfons Ostersetzer, Melegnano, near Milan, Italy, and Franz Riesenfeld, Vienna, Austria, assignors, by mesne assignments, to Catalin Corporation of America, Fords, N. J., a corporation of Delaware No Drawing. Original No. 1,858,168, dated May 10, 1932, Serial No. 263,205, March 20, 1928, and in Austria May 21, 1927. Application for reissue December 16, 1933, Serial No. 702,725

9 Claims. (Cl. 260—4)

In the U. S. application 134,128, Pollak and Ostersetzer, a process for the manufacture of phenol formaldehyde condensation products is described which, unlike the products hitherto known, have the structure of genuine gels and are more particularly distinguished by the greater facility with which they may be worked. The said prior process consists substantially in increasing the size of the resin molecule by an increase of the quantity of formaldehyde in the initial solution, and also in carrying out the further process so that the condensation solution at first forms a clear sol from which no resin is precipitated even on cooling, but which on the contrary during the slowly proceeding concentration, solidifies to a genuine gelatinous substance with the inclusion of the dispersion medium—the water which is still present. By hardening this gelatinous substance by heating, a dry and hard gel is obtained, the pores of which contain water particles of the colloidal order of magnitude, which impart to the mass a white ivory-like appearance. This process is carried out by causing the condensation of a solution containing a substantially greater molecular proportion of formaldehyde than phenol as for example 1 molecule of phenol to about 2½ molecules of formaldehyde, to take place in the presence of such large quantities of basic condensation agents that the condensation product formed is not precipitated, but remains in the solution, whereupon the solution is neutralized, and by distilling off the water, thickened to such an extent that the sol produced becomes gelatinized by the heat.

We have now found that in the above-mentioned process, the concentration, that is to say the removal of water, can be carried much further than has been heretofore, and that in this way entirely novel products are obtained. If the removal of water is carried by means of suitable measures to the uttermost possible limit, the pores of the hardened final product no longer contain water drops of the colloidal order of magnitude, so that the product will no longer have a white, non-transparent appearance, but a transparent opalescent appearance. In that way, perfectly clear materials may be manufactured.

The process of obtaining opalescent products substantially consists therefore in that the colloidal resin solution prepared as above stated is freed from water by distillation to such an extent that during the subsequent gelatinization and hardening, the pores of the hardened final product no longer contain any water drops of the colloidal order of magnitude, so that the mass has an opalescent appearance.

As suitable measures for an intensive water extraction may be used, for instance, distillation in a vacuum until the gelatinization, distillation with a greatly increased surface of the condensation solution or similar measures. The addition of organic solvents, such as for instance glycerine, is more particularly suitable for the purpose. If such organic solvents are added to the condensation solution before or during the process of distillation, the mass will remain a thin fluid even during the longer heating, and in that way the water can be expelled almost completely.

The novel processes hereinbefore described, are the result of exhaustive scientific research and of practical experiments which were intended to produce in place of the white product manufactured in accordance with application 134,128, a clear transparent product. Whilst according to the said prior case, the expulsion of water was carried out only until the condensation solution gave a clear sol, which however, on being gelatinized and hardened, produced completely clouded products, the novel problem has led to a more intensive extraction of water, with the result that the above-mentioned opalescent products have been obtained. However, the object in view was not completely attained thereby, as it has been found that however thorough the removal of water, completely transparent, glass-clear products could not be obtained.

Further research has now shown that the clouding in the products thus prepared, was not due alone to the presence of traces of colloidally distributed water, but also to the presence of salts colloidally distributed in the material. As the size of their particles is greater than that of the waves of light, these products are not transparent even when the water is expelled to such an extent that no water drops of colloidal order of magnitude are present in the pores of the hardened products. Even with the addition of organic solvents, such as for instance glycerine, it was impossible to obtain perfectly clear products.

The presence of salts in the material is unavoidable, as the initial condensation involves the presence of alkalis, and the hardening requires the addition of acid for the complete or partial neutralization. It is of course advisable not to use unnecessarily large quantities of condensing agents in order to avoid production of an excessive quantity of salts during the subsequent neutralization. But, even with the smallest addition of alkali sufficient to effect the condensation, the quantity of salts formed will be still so great that with the processes heretofore known it will be impossible to manufacture products of glass-clear appearance.

We have now unexpectedly found that perfectly glass-clear products may be obtained by using for the neutralization of the bases—starting from the condensation solution prepared in accordance with the processes described in the foregoing—acids which form with the said bases salts which become distributed in the material in such a manner that they do not cause any clouding of the products. It need not be decided whether the salts formed during this process are particularly adapted to become distributed in such a finely colloidal manner that their particles are smaller than the wave lengths of the light, or whether the clarifying effect on the material is due to the salts formed. The fact remains that when the acid used for the neutralization is suitably chosen for the previously described condensation solution, glass-clear products are obtained.

The best acid to be used will of course depend on the kind of bases originally added as condensing agent. When organic bases are used for the process of condensation, most acids may be used. It has been found, however, that it is not as a rule advisable to make use of the strong organic bases since these decompose at the temperatures used in the hardening step, and it is difficult to obtain large pieces of irreproachable quality.

Acids of organic nature the dissociation constant of which is between $10^{-2}$ and $10^{-5}$, also are however very suitable when strong inorganic bases are used as condensation agents, provided that their alkali salts are easily soluble in water. Enough acid is of course used to neutralize the base present.

Those organic acids of the acidity mentioned which, in addition to a carboxyl group, contain also another salt-forming group, that is to say di- or poly-carboxylic acids, oxy-carboxylic acids, sulpho-carboxylic acids or alcohol acids, have been found more particularly suitable for the purpose.

The process may be carried out in the following manner:

*Example 1.*—100 parts by weight of crystallized carbolic acid are heated for about ¾ hour under reflux, with 300 parts by weight of 30% formaldehyde and 23.2 parts by weight of twice normal caustic potash solution. A strongly exothermic reaction then takes place. To the still hot solution are added 5.8 parts by weight of phthalic acid in alcoholic solution, the sediment becoming discoloured. Thereupon the whole is evaporated to the greatest possible extent until the material can just be filled into moulds, and it is hardened at a temperature of 60–100° C. until the material becomes solid. In that way a very light coloured product of great strength and elasticity is obtained, the properties of which are substantially better than those of the known condensation products prepared with alkalis from phenols and formaldehyde, and this product may be more easily worked than the latter. It is more particularly distinguished by its not fading.

*Example 2.*—100 gms. by weight of crystallized carbolic acid are heated with 300 gms. of 30% formaldehyde, and 47½ gms. by weight of twice normal potash solution, as set forth in Example 1. The reaction is stopped after about a quarter of an hour. To the material is then added 70 cubic centimeters of twice normal lactic acid, and the hardening is effected as described in the foregoing. The product obtained is almost completely colourless and shows the same excellent properties as the product prepared according to Example 1.

Products which may be worked exceptionally well, are obtained by this process by the addition of suitable solvents or diluting agents in small quantities. The latter may be preferably used for the purpose of extracting the water from the material during the process of distillation, as completely as possible. This will be desirable in the majority of cases in order to avoid subsequent drying up and shrinking. The process may be however carried out also by adding solvents which have merely a diluting function, or solvents which react with the material itself or with the water present, in a suitable manner, to form the compounds desired.

*Example 3.*—The proceeding is the same as in the Examples 1 and 2, but to the condensation solution are added 25 parts by weight of 80% glycerine. The boiling in this case must be slightly lengthened on account of the dilution of the solution which has taken place. The products obtained are distinguished from those produced without addition, by a particularly great flexibility and ease with which they can be worked. Like galalith, they can be worked mechanically and therefore allow of a materially quicker and more advantageous working in a lathe. They may also be punched out and milled, which cannot be done with the condensation products from phenols and formaldehyde described in the foregoing.

*Example 4.*—If the process is carried out as described in Example 1, but using in place of the potash solution the corresponding quantity of twice normal piperidine solution, and saturating, not with an organic acid, but with the quantity of hydrochloric acid which is just sufficient for the neutralization, a very lightly coloured transparent product will be obtained, which is very easily worked.

*Example 5.*—In the same way as in the process according to Ser. No. 134,128, in the new process it is also practically immaterial which condensation agents are used in each case, provided that the strongly alkaline phase is introduced before the distillation and the subsequent neutralization. Therefore, in the same way as in said prior case, the process may be worked so that the condensation is first started in the acid phase and continued in the alkaline phase. In the same way, also a polyphase process leads to completely clear products.

If it is desired to begin the condensation in the acid phase, the proceeding may be, for instance, as follows:

*Example 6.*—100 gms. of carbolic acid are heated with 300 gms. of formaldehyde and about 1 gm. 2nHCl for 1 hour; the white resin thereby precipitated is dissolved by the addition of about 50 cubic centimeters of 2nKOH and is now condensed for 25 minutes in a medium which is alkaline. Thereupon are added about 12 gms. phthalic acid and 35 gms. glycerine, the whole is distilled and after the heat treatment, a clear product is obtained.

Obviously, in place of the free bases, salts also can be used for the condensation, which salts react with the free phenol in the heat to form phenolates, as the action of this is identical with that of the free base. For instance carbonates of alkalis or of organic bases may be used.

The process can be varied without departing from the invention. For instance any other phenols suitable for the purpose, also any other suitable aldehydes, more particularly their polymers, may be used for the condensation.

The products manufactured by the process according to this invention are distinguished not only by their perfectly glass-clear nature but also by being particularly easy to work and nonfading. By the phrase "glass clear" we intend to refer to the transparency of the product and do not mean to state that the same is entirely colorless.

We claim:

1. A process for the manufacture of phenol formaldehyde condensation products, which comprises neutralizing with one of the group consisting of phthalic, lactic and hydrochloric acids the colloidal resin solution prepared from approximately 1 mol of phenol and about 2.5 mols of formaldehyde in the presence of a basic condensing agent, and free such product from water to such an extent that a hardened gel results in the pores of which product no drops of water of the colloidal order of magnitude remain, and the material has therefore a transparent appearance.

2. Glass-clear condensation products comprising the reaction products formed by reacting one mol of phenol and two and one-half mols of formaldehyde in the presence of sufficiently strongly alkaline medium to prevent precipitation, adding one of the group consisting of phthalic, lactic and hydrochloric acids, in such quantity that the reaction mass is weakly acidic, and distilling the mass until the water content is completely removed.

3. In the process of producing resinous bodies by reacting on a phenolic body with formaldehyde in the proportion of approximately one mol of phenolic body to about 2.5 mols of formaldehyde, in the presence of an aqueous solution of an alkaline condensing agent present in sufficient quantity to hold the condensation product in solution during condensation stopping such reaction while the reaction products are in solution in the water present and substantially neutralizing and thereafter removing water and hardening, the steps of accomplishing such final neutralization of the alkaline condensing agent with a carboxylic acid the dissociation constant of which is between $10^{-2}$ and $10^{-5}$ and the alkali salts of which are easily soluble in water, freeing the condensation product from water to such an extent that a hardened gel results having substantially no water in its pores of a colloidal order of magnitude.

4. A process as specified in claim 3, in which the acid used for neutralization is selected from the group consisting of phthalic and lactic acids.

5. A process as specified in claim 3, in which the alkaline condensing agent is an alkali hydroxide and the acid used for neutralizing is selected from the group consisting of phthalic and lactic acids and a sufficient amount of such acid is used to render the gel weakly acid.

6. A process for the maufacture of phenol and formaldehyde condensation products which comprises neutralizing with one of the group consisting of phthalic and lactic acids the colloidal resin solution prepared from approximately one mol of phenol and about 2.5 mols of formaldehyde in the presence of a basic condensing agent which is a member of the group consisting of potash and organic bases and freeing such product from water to such an extent that a hardened gel results in the pores of which product no drops of water of a colloidal degree of magnitude remain and the material has therefore a transparent appearance.

7. The method of preparing phenol-formaldehyde condensation products which comprises reacting phenol and formaldehyde in approximately the proportions of one mol of phenol to about 2.5 mols of formaldehyde in the presence of an alkaline catalyst under conditions to produce a sol, adding glycerine and an acid selected from the group consisting of phthalic acid and lactic acid in quantity sufficient to render the mass slightly acid, thickening the mass by evaporating off water until the bulk of the water is removed and hardening with heat to produce a transparent hardened gel.

8. A process as specified in claim 7, in which both glycerine and phthalic acid are employed.

9. A process of producing phenol-formaldehyde reaction products which comprises reacting phenol and formaldehyde in the proportions of approximately 1 mol of phenol to about 2.5 mols of formaldehyde, in the presence of an alkaline catalyst under conditions to produce a sol, adding glycerine and phthalic acid in quantity sufficient to render the mass slightly acid, evaporating off water and heating to form a gel and hardening the gel.

ALFONS OSTERSETZER.
FRANZ RIESENFELD.